Feb. 10, 1948.                J. S. NEWTON                2,435,633
             TWO-SPEED TRANSMISSION FOR LOCOMOTIVE TURBINES
                           Filed June 18, 1946
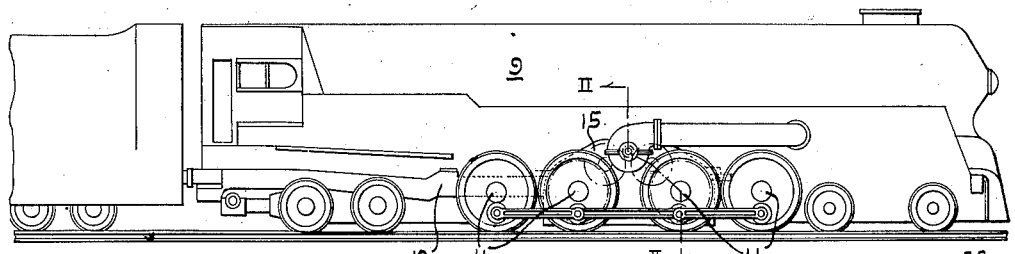
FIG. I.
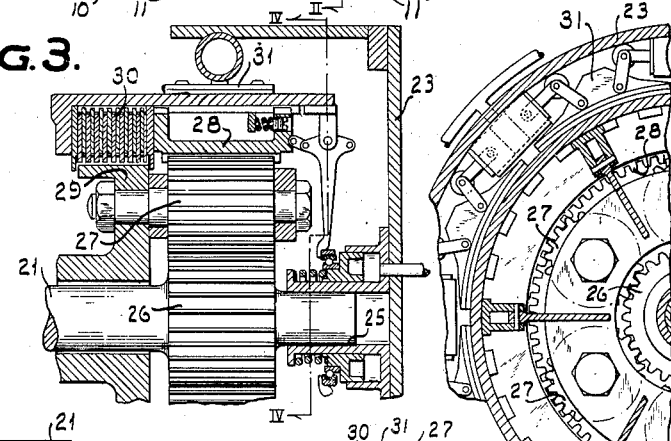
FIG. 3.
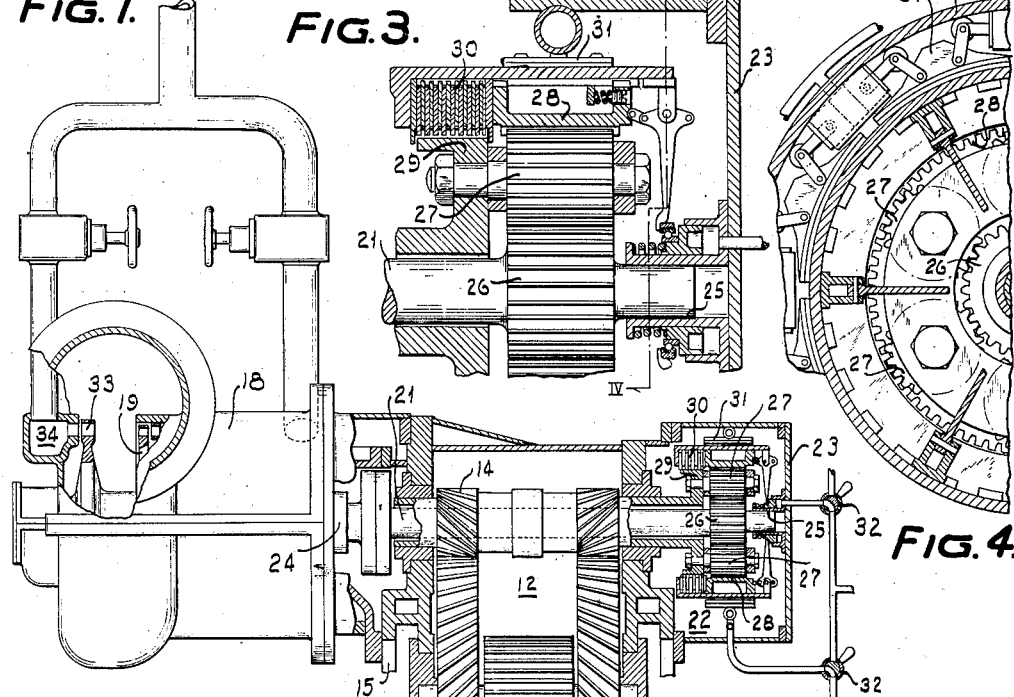
FIG. 4.
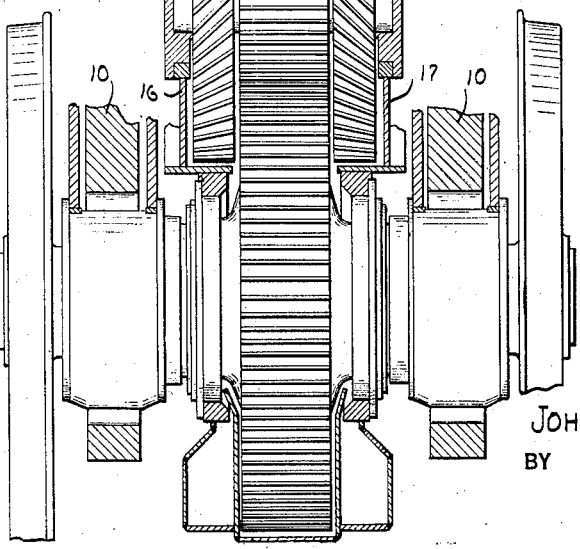
FIG. 2.
WITNESSES:
J. K. Mosser
V. W. Novak
INVENTOR
JOHN S. NEWTON
BY
a. B. Rivis
ATTORNEY Patented Feb. 10, 1948

2,435,633

UNITED STATES PATENT OFFICE 2,435,633

TWO-SPEED TRANSMISSION FOR LOCOMOTIVE TURBINES

John S. Newton, Lansdowne, Pa., assignor to Westinghouse Electric Corporation, East Pittsburgh, Pa., a corporation of Pennsylvania Application June 18, 1946, Serial No. 677,541

3 Claims. (Cl. 105—38)

The invention relates to turbine-driven locomotives and the like and it has for an object to provide apparatus of this character which is efficient both at low or reversing speeds and at high or full speed.

A more particular object of the invention is to provide reduction gearing driving propelling means and having a driving pinion to which power is delivered from a reversible turbine through a two-speed planetary transmission including a clutch and brake with means for rendering the latter alternatively effective for driving the pinion at turbine speed and at a speed which is less than turbine speed.

In a locomotive, where reduction gearing is used to transmit power to the traction wheels, good design dictates that the turbine shall operate with best efficiency at normal running speed, and this necessarily entails operation at lower efficiency at low speeds, or while accelerating, in consequence of which the turbine is usually larger than necessary for the full speed condition. In accordance with the present invention, a two-speed planetary transmission is provided between the turbine and the reduction gear so that the turbine may be operated at high efficiency both at full and low speeds, in consequence of which a turbine of minimum physical dimensions may be used; and, by having the turbine and the planetary gearing supported from opposite sides of the main reduction gear case, the arrangement as a whole is rendered suitable for the limited space available in a locomotive. Furthermore, because of the higher turbine speed permitted by the two-speed transmission at a low propulsion speed, it becomes practicable to use a turbine having a very simple arrangement of reversing blading or buckets.

A more particular object of the invention is to provide a locomotive having a frame carried by traction wheels driven by reduction gearing whose casing is supported by the frame and the gearing including a driving quill pinion to which power is delivered by a two-speed planetary transmission from a turbine, the turbine and the two-speed transmission being supported by the reduction gear casing adjacent to opposite ends of the pinion and the turbine driving a quill shaft extending through the quill pinion and which is connected to the end of the latter remote from the turbine by the two-speed planetary transmission.

These and other objects are effected by the invention as will be apparent from the following description and claims taken in connection with the accompanying drawings, forming a part of this application, in which:

Fig. 1 is a side elevational view of a locomotive provided with the improved transmission;

Fig. 2 is a view partly in elevation and partly in section of the turbine and transmission;

Fig. 3 is a fragmentary sectional view of the two-speed planetary gear used to change the ratio of turbine speed to reduction gear speed for improved turbine performance over the propulsion speed range; and Fig. 4 is a sectional detail view of the planetary gear brake.

In the drawings, there is shown a locomotive 9 having a frame 10 carried by axles including driving axles 11. The driving axles are driven by reduction gearing, at 12, including the driving quill pinion 14.

A housing 15, carried by the frame, encloses the reduction gearing, and it has opposite sides 16 and 17 provided with bearings for the latter.

As shown, the driving pinion 14 is of the quill type. A turbine, including a casing 18 and a rotor 19, is aligned axially with the pinion and the turbine casing is attached to and supported by the housing side 16.

The turbine rotor 19 has a quill shaft 21 extending through the pinion and connected to the end of the latter remote from the turbine by means of a two-speed gearing, at 22, in the gear casing 23 attached to the housing side 17 adjacent to the end of the quill pinion remote from the turbine.

The quill shaft 21 is supported by the turbine bearing 24 and by the gear casing bearing 25 so as to be free of the interior of the quill pinion.

The two-speed planetary transmission comprises a sun gear 26 connected to the quill shaft 21 adjacent to the bearing 25 and meshing with planet pinions 27, which mesh with the orbit gear 28. The planet pinions 27 are mounted on a carrier 29 connected to the quill pinion.

The bearing 25, carried by the gear casing connected to the housing, assures of a coaxial relation of the sun gear and the quill pinion. Also, while attachment of the turbine casing and the gear casing to the housing adjacent to opposite ends of the quill pinion assures of a coaxial arrangement of the casings and the quill pinion, the provision of a quill shaft extending through the quill pinion gives the needed flexibility to compensate for small inaccuracies or tolerances, with the result that the apparatus runs smoothly and without being unduly stressed. Furthermore, torsional flexibility introduced by the quill shaft provides for better accelerating and decelerating conditions of the turbine in relation to the locomotive, with the result that high rates of change of speed are accommodated.

A multiple-disk clutch 30 is engageable to connect the carrier and the orbit gear, whereby such clutch serves to connect the quill shaft to the quill pinion to drive the latter at turbine speed.

A brake 31, carried by the gear casing 23, is effective to hold the orbit gear 28 against rotation so that, with the clutch released, the gears function as a train to drive the quill pinion at a speed less than turbine speed.

The clutch and the brake are operable by any suitable means, for example, there is shown manually-operable valve means 32 for supplying fluid under pressure to apply the brake or to connect the clutch.

Because of the speed reduction due to the two-speed transmission, it is feasible, by relatively simple modification of a turbine, which is essentially one of the forward type, to provide for reverse of the locomotive without shifting or sliding of gears, the turbine rotor 19 being formed with reversing buckets 33 supplied with elastic fluid by suitable nozzles 34.

The arrangement described simplifies a geared turbine locomotive, and it has the following advantages: Less steam is used for acceleration and at low speeds; reversing is effected without the use of a separate backing turbine or shifting of gears; the turbine can be proportioned for higher efficiency at all speeds and, therefore, a smaller and cheaper turbine may be employed; backing for slack is simple and effective; the turbine may be used as steam brake; and, because of high efficiency at high and low speeds, the locomotive is effective both for passenger and freight service. Furthermore, aside from the housing structure supporting the turbine and the gearing, whereby alignment and parallelism of rotating parts of the plant are influenced to a minimum extent by locomotive frame deflection, the relationship of the turbine and planetary gearing to the quill pinion, not only provides a coaxial aggregate, but one in which a quill shaft extends freely through the quill pinion to connect the turbine to the planetary gearing, which drives the quill pinion, such an arrangement of quill shaft giving the flexibility needed for smooth acceleration and deceleration and to accommodate for misalignment of the turbine with respect to the gearing.

While I have shown the invention in but one form, it will be obvious to those skilled in the art that it is not so limited, but is susceptible of various changes and modifications without departing from the spirit thereof.

What is claimed is:

1. In a locomotive, the combination of a frame supported by axles including one or more driving axles, a housing structure carried by the frame, reduction gearing for transmitting power to the driving axle or axles, said reduction gearing being rotatably supported by the housing structure within the latter and including a driving quill pinion, a reversible turbine supported by the housing structure in axial alignment with the pinion, a quill shaft driven by the turbine and extending through the quill pinion, a gear casing carried by the housing structure adjacent to the end of the quill pinion remote from the turbine, a sun gear within the casing and carried by the quill shaft, an orbit gear within the casing, planet pinions meshing with the sun and orbit gears, a carrier for the planet pinions connected to the quill pinion, a clutch operative to connect the orbit gear and the carrier, a brake operative to clutch the orbit gear to the casing, and means providing for connection of the clutch and release of the brake and vice versa.

2. In a locomotive, the combination of a frame supported by axles including one or more driving axles, a housing structure carried by the frame, reduction gearing for transmitting power to the driving axles, said reduction gearing being rotatably supported by the housing structure within the latter and including a driving quill pinion, a reversible turbine supported by the housing structure in axial alignment with the pinion, a quill shaft driven by the turbine and extending through the quill pinion, a gear casing carried by the housing structure adjacent to the end of the quill pinion remote from the turbine, a pair of bearings carried by the turbine casing and the gear casing for supporting the quill shaft free of the quill pinion, a sun gear within the casing and carried by the quill shaft, an orbit gear within the casing, planet pinions meshing with the sun and orbit gears, a carrier for the planet pinions connected to the quill pinion, a clutch operative to connect the orbit gear and the carrier, a brake operative to clutch the orbit gear to the casing, and means providing for connection of the clutch and release of the brake and vice versa.

3. In a self-propelled structure, the combination of propelling means carried by the structure, a housing carried by the structure, reduction gearing for transmitting power to the propelling means, said reduction gearing being rotatably supported by the housing within the latter and including a driving quill pinion, a reversible turbine and a gear casing supported by the housing adjacent to opposite ends of the pinion, a quill shaft driven by the turbine and extending through the quill pinion, bearings carried by the turbine and by the gear casing for supporting the quill shaft so that the latter is free of the quill pinion, a sun gear carried by the quill shaft between said gear casing bearing and the adjacent end of the quill pinion, an orbit gear within the gear casing, planet pinions meshing with the sun and orbit gears, a carrier for the planet pinions connected to the quill pinion, a clutch for connecting together the orbit gear and the carrier, a brake carried by the gear casing and operative to clutch the orbit gear to the latter, and means operative to connect the clutch and to release the brake and vice versa.

JOHN S. NEWTON.